United States Patent [19]

Greiner

[11] Patent Number: 4,848,913

[45] Date of Patent: Jul. 18, 1989

[54] THICKNESS MEASURING DEVICE FOR INSULATING GLASS

[76] Inventor: Reuben U. Greiner, 1010 W. Maple St., Lebanon, Oreg. 97355

[21] Appl. No.: 190,333

[22] Filed: May 5, 1988

[51] Int. Cl.[4] .............................................. G01B 11/06
[52] U.S. Cl. .................................................... 356/382
[58] Field of Search ........................... 356/381, 382, 15

[56] References Cited

U.S. PATENT DOCUMENTS 3,257,895 6/1966 Garraway ........................... 356/382

Primary Examiner—F. L. Evans
Attorney, Agent, or Firm—John F. Ingman

[57] ABSTRACT

A thickness measuring gauge for insulating glass which includes, in the preferred embodiment, a sighting member with a front sight, a rear sight and a sight tube through which the user takes an angled sighting of the insulating glass with the device in contact with the near side surface thereof. A separate reflective member is situated on the far side of the insulating glass to reflect into view the image of a target member. The target member is attached to a movable slide affixed to the device, which may have its position adjusted so as to align the target reflection with the sight. A series of steps are formed on the movable slide, each of which represent a different thickness of single glass sheet (two or more of which comprise the insulating glass), while marks inscribed on the base of the device each represent a standard thickness of insulating glass. The sight-aligned position of the target is read in conjunction with the appropriate single glass sheet thickness so as to permit direct determination of the thickness of the insulating glass. The reflective member which is positioned on the far side of the insulating glass may be temporarily affixed thereto by a spring member connected to a suction cup adhering to the glass surface. A separate glass thickness gauge may be incorporated into the device to allow convenient direct measurement of the thickness of a single glass sheet.

13 Claims, 3 Drawing Sheets

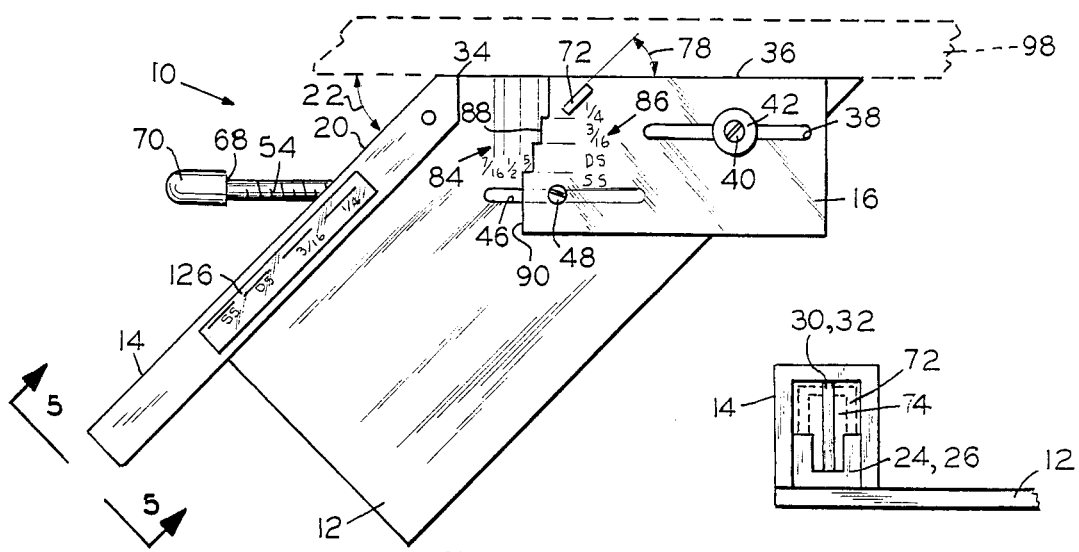
FIG. 2
FIG. 5
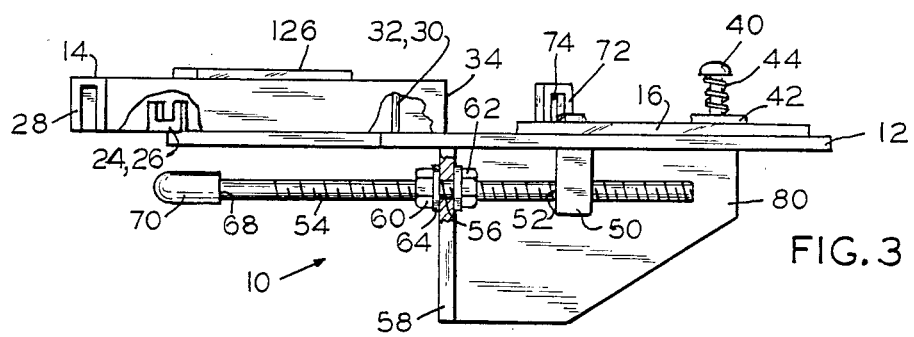
FIG. 3
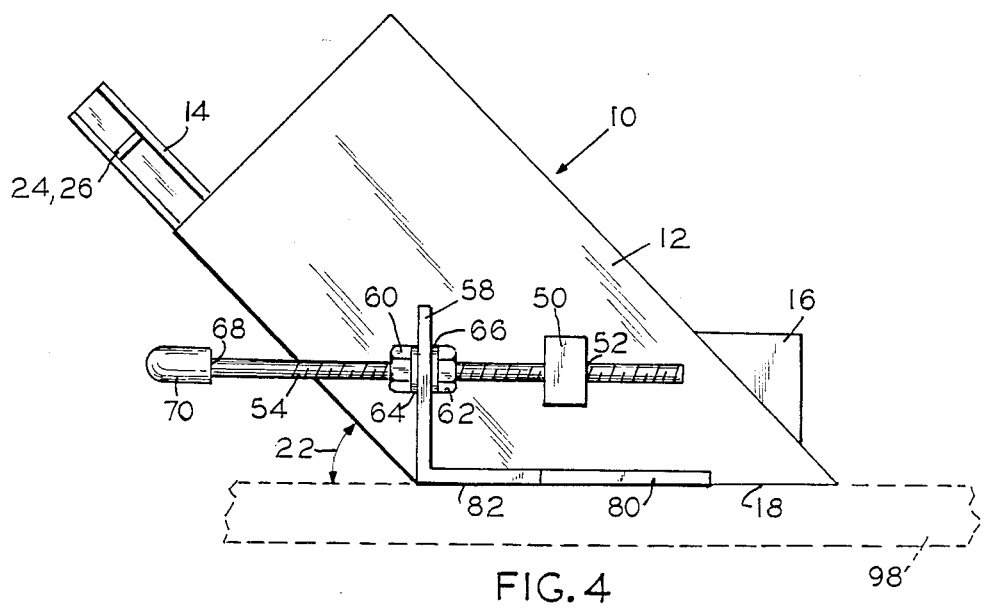
FIG. 4

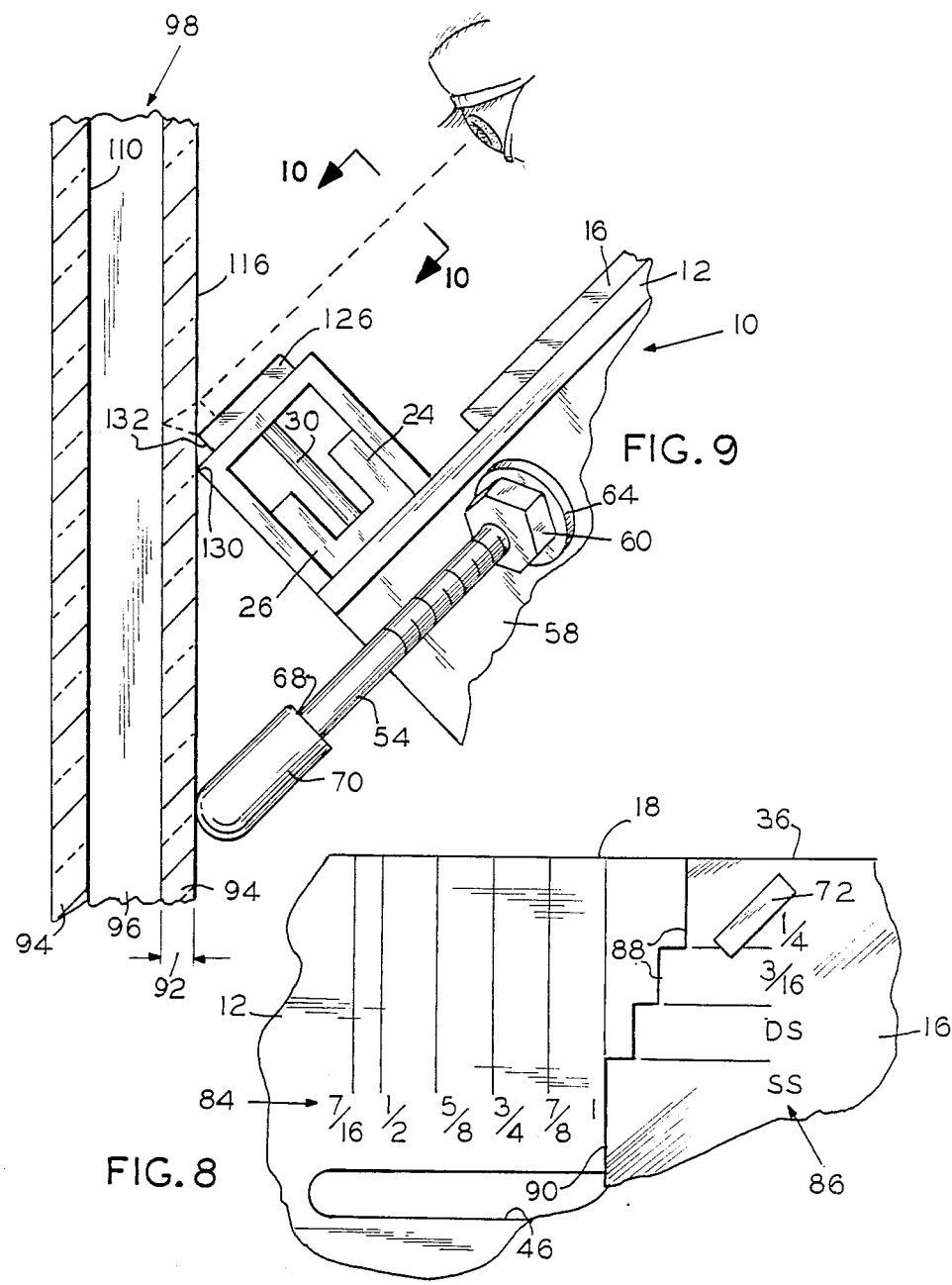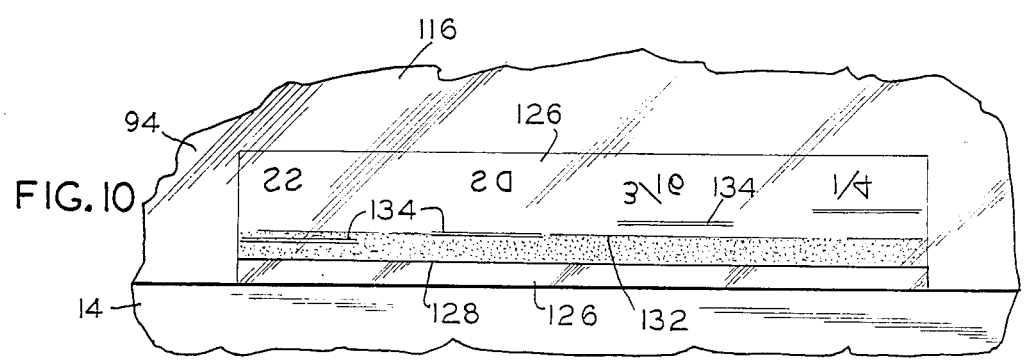

THICKNESS MEASURING DEVICE FOR INSULATING GLASS

BACKGROUND OF THE INVENTION

1. Field of the Invention

This invention generally relates to a device for measuring the thickness of glass, and, more particularly, a thickness measuring device for insulating glass.

2. Description of the Prior Art

In the window and glass replacement profession, there is often the need to accurately determine the thickness of glass for replacement without an edge of the window being replaced being readily available for measurement. This is particularly critical with windows using insulating glass, i.e., two (or more) sheets of glass separated by air space, wherein the air within the separation acts as a thermal barrier. The difference in thickness between commonly available types of insulating glass may be as little as 1/16-inch, yet that thickness must be accurately determined for ordering and installation of a replacement.

The prior art has developed several devices for measuring the thickness of transparent materials from a single side. Such devices, as in U.S. Pat. Nos. 1,503,543; 1,756,785; 1,875,665; and 3,807,870 commonly utilize an active light source in conjunction with optics to measure the thickness of the material. Such devices are normally expensive and cumbersome, and not designed for field use. Furthermore such devices are not capable of directly measuring the thickness of insulating glass.

U.S. Pat. No. 3,320,849 by J. R. Cumberland presents a glass thickness gauge which is convenient for use, but is not capable of measuring the thickness of insulating glass.

There exists a need for a simple, inexpensive field device for accurately measuring the thickness of insulating glass, particularly when an edge thereof is not available.

SUMMARY OF THE INVENTION

The present invention provides a thickness measuring device for insulating glass designed to satisfy the aforementioned need. The invention involves sighting means through which the user views a surface of the insulating glass at an angle and aligns therein the reflected image of a target. The target is attached to a movable slide on the device, and is reflected into the view of the user from a reflective surface located on the far side of the window. Scales inscribed on the movable slide and on the base of the device indicate, in combination, the thickness of the insulating glass.

Accordingly, in the preferred embodiment, the invention comprises a device having a sighting member, with a front sight, a rear sight, and a sight tube, through which the user takes an angled sighting of the insulating glass with the device in contact with the near surface thereof. A separate reflective member is situated on the far side of the window to reflect into the user's view the image of a target member. The target member is attached to a movable slide, affixed to the device, which may have its position adjusted so as to align the target reflection with the sighting means. A series of steps are formed on the movable slide, each of which represent a different thickness of single glass sheet (two or more of which comprise the insulating glass), while marks inscribed on the non-movable base of the device each represent a standard thickness of insulating glass. The sight-aligned position of the target is read in conjunction with the single glass sheet thickness so as to permit direct determination of the thickness of the insulating glass.

The reflective member which is positioned on the far side of the insulating glass may be temporarily affixed thereto by a spring member connected to a suction cup adhering to the far side of the insulating glass.

A separate glass thickness gauge may be incorporated into the device to allow convenient direct measurement of the thickness of a single glass sheet.

BRIEF DESCRIPTION OF THE DRAWINGS

FIG. 2 illustrates a top view of the thickness measuring device of FIG. 1.

FIG. 3 illustrates a side view of the thickness measuring device of FIG. 1.

FIG. 4 illustrates a bottom view of the thickness measuring device of FIG. 1.

FIG. 5 shows an end view of the sighting means as seen at 5—5 of FIG. 2.

FIG. 8 provides an enlarged view of the preferred scales of the thickness measuring device.

FIG. 9 illustrates a side view of the thickness measuring device utilizing an attached glass thickness gauge to measure the thickness of an individual glass sheet.

FIG. 10 provides the user's view, as seen at 10—10 of FIG. 9, of the reflection of the attached glass thickness gauge.

DESCRIPTION OF THE PREFERRED EMBODIMENT

Figure 1:
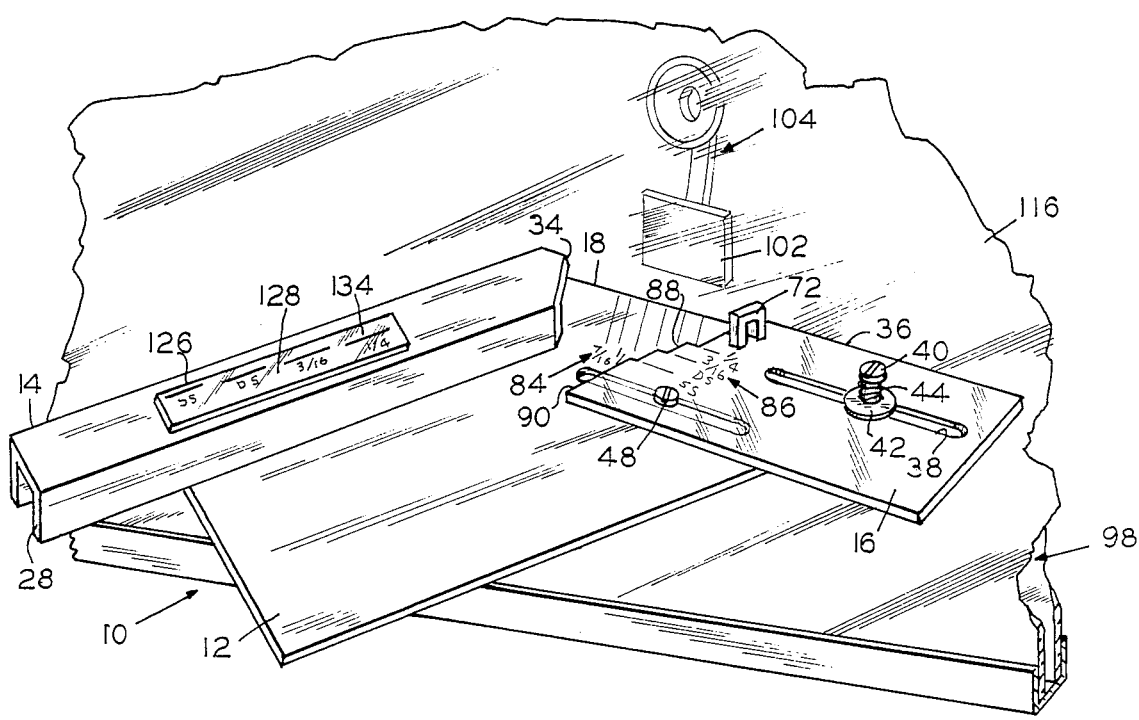
FIG. 1 illustrates a perspective view of the thickness measuring device for insulating glass.

Referring now to the drawings, and in particular to FIG. 1 through FIG. 4, there is shown the preferred embodiment of the measuring device for insulating glass 10. A base 12 supports a sight tube 14 and a movable slide 16. The front edge 18 of the base 12 is placed against the near surface 116 of the insulating glass 98, normally in the form of a window, during measurement of the insulating glass thickness 120, as will be described later. The sight tube 14 is oriented along side edge 20 of the base 12 at an angle 22 to the forward edge 18. The preferred angle 22 is 45-degrees. Although other angles may be satisfactory, an angle 22 of 45-degrees allows practical construction of the measuring device 10.

Within sight tube 14, two sighting elements, a rear sight 24 and a front sight 30, are used to provide transverse alignment and thus accurate sighting down the tube 14. A variety of types of sighting elements are available. A rear sight 24 in the form of a buckhorn type sight 26 is preferred as the sight closest to the eye end 28 of sight tube 14, in conjunction with a front sight 30 in the form of a post type sight 32 near the forward end 34 of sight tube 14. However, a post-type sight 32 also works satisfactorily for the rear sight 24, especially if contrasting shades of post-type sights 32 are used. Other types of sight combinations may be equally suitable. It also should be recognized that an enclosed sight tube 14, in rectangular cross section as illustrated, is useful, but not necessary. The function of the sight tube 14 is to provide support and protection for the sighting elements, and to restrict the field of view so as to aid the user. It also may be used so support a glass thickness gauge 126, as later described. However, sighting elements could emanate directly from the base 12 without the use of sight tube 14 and still perform satisfactorily in the thickness measuring device 10.

The movable slide 16, in the preferred embodiment, is constructed so that its front edge 36 slides adjacently to the front edge 18 of base 12. The preferred sliding mechanism involves a slot 38 formed in the movable slide 16 parallel to its front edge 36 through which fastening means, such as a screw 40, extend into base 12. A washer 42 and compression spring 44 are mounted on screw 40 so as to provide resilient pressure on the movable slide 16 against base 12. A second slot 46 is formed in base 12, parallel to slot 38 and the forward edge 18 of base 12. Fastening means, such as screw 48, attached through the movable slide 16, extends through slot 46 where it attaches to slide adjusting block 50. Transverse to the attachment of screw 48, a threaded aperture 52 is formed in adjusting block 50 parallel to slot 46, so as to act as a threaded receiving member, through which an elongated threaded shaft 54 is inserted. The threaded shaft 54, in turn, extends through an aperture 56 in base extension 58 where the shaft 54 is mounted for support. The mounting at base extension 58 is such that the position of the threaded shaft 54 relative to base extension 58 does not change when the shaft 54 is rotated, this being accomplished by the fixing in place of nuts 60 and 62, or other limiting means, onto shaft 54 on either side of the base extension 56, as illustrated. Washer 64 and 66, placed between nuts 60, 62 and the base extension 58, assist in smooth turning and prevent wear. The end 68 of threaded shaft 54 extends beyond the side edge 20 of base 12 whereon a knob 70 is placed so that the shaft 54 may readily be turned. By rotating threaded shaft 54, the slide adjusting block 50, and thus the movable slide 16, may be moved so as to position movable slide 16 at the desired location on the base 12.

Also mounted on movable slide 16 is a target 72. As will be described in greater detail subsequently, the insulating glass thickness measuring process involves the alignment of a reflection of the target 72 with the sighting elements 24 and 30. While numerous forms of target 72 could be utilized, a preferred form of target 72 includes a vertical slot 74 formed therein, the width of the slot 74 being sufficient to permit open space to be viewed on both sides of the post-type front sight 30, 32 when properly aligned. The target 72 preferably is located near the front edge 36 of the movable slide 16, and is oriented at an angle 78 relative to front edge 36 which is substantially the same as angle 22 between the sight tube 14 and the front edge 18 of base 12, i.e., preferably at a 45-degree angle.

A front edge extension 80 extends transversely from the base 12 at, and parallel to, the front edge 18 so as to provide a broad surface area 82 to press against the insulating glass being measured and thus assure that the forward edge 18 of the base 12 is oriented against to the insulating glass surface 116.

Two different scales, or sets of index marks, are utilized in the thickness measuring device for insulating glass 10. An insulating glass thickness scale 84 is marked on the base 12, the markings extending back from the forward edge 18 of base 12. The preferred set of marks on scale 84 include those corresponding to common thicknesses of currently available dual glazed insulating glass, i.e., 7/16-, ½-, ⅝-, ¾-, ⅞-and 1-inch. Other scale markings can be included, of course, as desired.

The second scale is a single glass sheet thickness scale 86 which is formed or inscribed into the movable slide 16. This scale 86, in a preferred embodiment, may be represented by steps 88 formed into the edge 90 of the movable slide 16 nearest the sighting tube 14. Each of the steps 88 relates to the thickness 92 of a single glass sheet 94, wherein two single glass sheets 94, separated by an air space 96, comprise a dual glazed insulating glass pane 98, as would be placed in a window or door, illustrated in cross section at FIG. 7. Each of the steps 88 is identified accordingly as to the thickness 92 of the single glass sheet 94 which it represents, the steps 88 themselves being oriented perpendicular to the front edge 36 of the movable slide 16. In the preferred embodiment, four steps 88 are provided and marked, representing the single glass sheet 94 thicknesses 92 of ¼-, ⅜-, ⅛-, and 7/64-inch. These thicknesses 92 are the most common single glass sheets 94 used in dual glazed insulating glass. The latter two thicknesses 92, ⅛-inch and 7/64-inch, are known in the trade as "double strength" (DS) and "single strength" (SS) respectively, and preferably are so marked. Other steps 88 can be added to scale 86 as desired. While it is believed halpful to utilize the edge 90 of the movable slide 16 for the scale 86, clearly the scale 86 could be only inscribed on a transparent movable slide 16 for satisfactory use. FIG. 8 shows an enlarged view of the scales 84 and 86.

A reflective surface 102 is positioned on the far side of the insulating glass being measured to provide the reflection of the target 72 for alignment with the aiming sights 24 and 28 within the sight tube 14. Such reflective surface 102 may be provided in a number of ways, the preferred manner being a reflector member 104 comprising a piece of reflective tape 106, attached to a 2-inch square piece of stiff plastic backing 108, which reflective tape 106 presses against the far surface 110 of the insulating glass 98 and is held there by a spring member 112 which in turn is attached to a common suction cup 114 of approximately 1-inch in diameter. Such reflective member 104, while simple in design, has proved to be effective.

Figure 7:
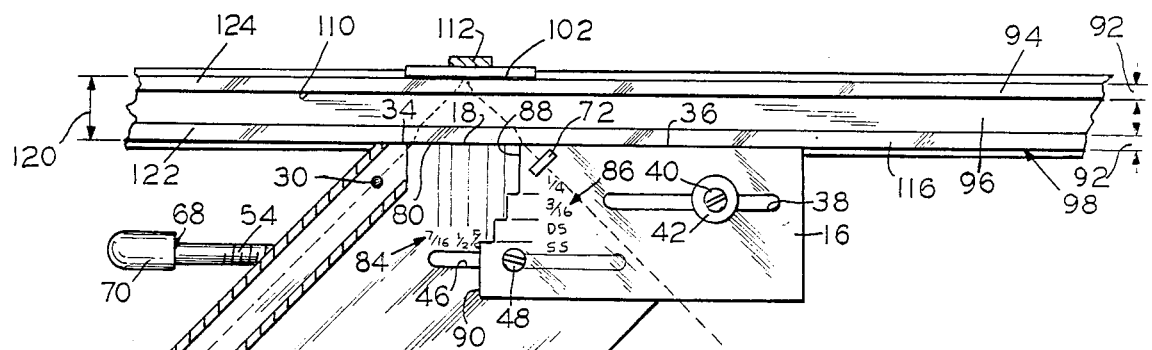
FIG. 7 illustrates a partially sectioned top view of the thickness measuring device in use, showing the line of sight alignment of the sighting means and the target member.
Figure 6:
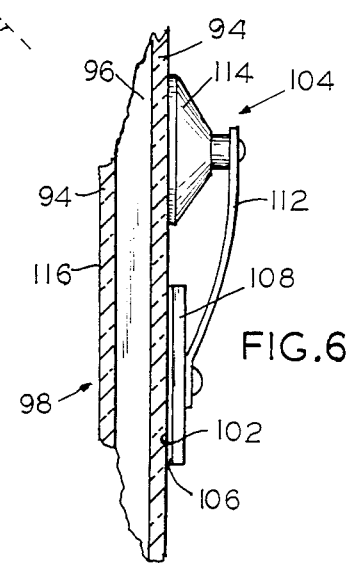
FIG. 6 shows a side view of the relective member as temporarily affixed to a single glass sheet.

The manner and theory of use of the thickness measuring device for insulating glass 10 is best seen at FIG. 7. The device 10 is placed so that the base front edge 18 and front edge extension 80 are placed flush against the near surface 116 of the insulating glass 98. This positions the sight tube 14, in the preferred embodiment, at a 45-degree angle to the surface 116. Opposite the front sight 30 and target 72, on the far surface 110 of the insulating glass 98, the reflective surface 102 has been temporarily located so that when looking through the sight tube 14, the reflected image of the target 72 is in view. The knob 70 on the end 68 of the threaded shaft 54 is then rotated so that the vertical slot 74 of the target 72 is in line with the rear sight 24 and front sight 30. The result is shown in FIG. 7, where the line of sight 118 is indicated. The measuring device 10 then may be removed from the surface 116 and the thickness 120 of the insulating glass 98 read directly therefrom.

The proper reading of the thickness 120 will depend on the thickness 92 of the single glass sheets 94 which make up the insulating glass. As is common knowledge, when light, or a line of sight, is directed at a piece of glass at an angle, that portion penetrating the glass will do so at an angle different than in the air. The bending of the line of sight when it passes obliquely from one medium into another in which the velocity of light is different, is generally termed refraction. Thus, as shown in FIG. 7, with dual-glazed insulating glass 98, the line of sight 118 initially impinges on the glass 98 at 45-degrees, its direction changes as it proceeds through the first single pane of glass 122, resuming its original direction as it continues through the air space 96 between the single glass panes 122 and 124, and subsequently its direction is again changed in the second single pane of glass 124, as in the first pane 122. Upon being reflected at the far surface 110 of the second pane of glass 124, here by the reflective surface 102, the line of sight 118 returns along a similar varying path until it emerges from the near surface 116 and passes through the target 72. Thus the location of the aligned target 72 of the movable slide 16 is relative both to the overall thickness 120 of the insulating glass 98 and to the relative amounts of glass material and air that the line of sight 118 passes through. The correct reading of the appropriate insulating glass thickness scale 84, marked relative to the front edge 18 of base 12, will depend not only on the overall thickness 120 of the insulating glass 98 but also on the thickness 92 of the single glass sheets 94 (122 and 124) which comprise the insulating glass 98. Thus, as described previously, a single glass sheet thickness scale 86 is incorporated into the measuring device 10, so the correct thickness 120 of the insulating glass 98 can be read directly from the device by taking into account the proper single glass sheet thickness 92.

In FIG. 8, a proper reading for single strength (SS) glass thickness on scale 86 would be an insulating glass thickness reading on scale 84 of one-inch.

The location of the index marks of the single glass sheet thickness scale 86 and the insulating glass thickness scale 84 are readily calculable under existing formulae, as will appreciated by the person skilled in the optic arts. However, the position of the index marks also are easily empirically determined using the actual glass and window thicknesses commonly available, and such empirical determination is preferred due to manufacturing variations from the nominal thickness of the single sheets of glass.

While the drawings and above description are oriented to the more common dual-glazed (two single sheets of glass with an intervening air space) insulating glass, the invention equally applies to more complex insulating glass, such as those with a triple glazed window (three glass sheets and two air spaces). A thickness indicator for more complex insulating glass can be created as easily as for dual glazed insulating glass, the difference being only in the scales selected for the measuring device 10.

Finally, since the thickness 92 of a single glass sheet 94 is needed for determination of which index mark on the single glass sheet thickness scale 86 is used, there may be conveniently included on the indicator 10 a glass thickness gauge 126. Because of its simplicity, a glass thickness gauge utilizing the concept of U.S. Pat. No. 3,320,849, by Cumberland, is used. A reflective surface 128 etched appropriately with short lines 134 representing single sheet glass thicknesses (e.g., SS, DS, 3/16- and ¼-inch) may be located atop the sight tube 14. The knob 70 at the end 68 of the threaded shaft 54 is positioned so that, when the upper edge 130 of the sight tube 14 and the knob 70 are placed against the surface 116, the reflective surface 128 will be oriented at approximately a 45-degree angle to the surface. This is best seen in FIG. 9. The edge 132 of the reflective surface 128 is preferred to the longer line (not shown) in the Cumberland device. When oriented at a 45-degree angle, the alignment of the reflected edge 132 with the appropriate short line 134 will permit instant reading of the thickness 92 of the single glass sheet 94, per Cumberland's teaching. FIG. 10 illustrates the reading of a double strength (DS) thickness 92 of a single glass sheet 94. The operation of the glass thickness gauge 126 is described more completely in the Cumberland patent and is not repeated here.

It is thought that the thickness measuring device for insulating glass of the present invention and its many attendant advantages will be understood from the foregoing description and that it will be apparent that various changes may be made in form, construction and arrangement of the parts thereof without departing from the spirit and scope of the invention or sacrificing all of its material advantages, the forms hereinbefore stated being merely exemplary embodiments thereof.

I claim:

1. A thickness measuring device for insulating glass having a plurality of single glass sheets which are parallel and separated by air space, the insulating glass having a near or first surface and a far or second surface, said thickness measuring device comprising:
    a. a base member, having a front edge for contacting said first surface of the insulating glass;
    b. sighting means mounted on said base and oriented angularly toward said first surface of the insulating glass;
    c. a movable member, slidingly attached to said base member, and having positioning means;
    d. a target member, mounted on said movable member;
    e. a plurality of markings on said base, each indicating a thickness of insulating glass;
    f. a plurality of markings on said movable slide, each indicating a thickness of said single glass sheets; and
    g. a separate reflective member for positioning on said second surface of the insulating glass.

2. The thickness measuring device for insulating glass, as recited in claim 1, wherein the sighting means comprise a sighting member which includes a front sight and a rear sight which are mutually alignable.

3. The thickness measuring device for insulating glass, as recited in claim 2, wherein the sighting means also include a sight tube which encloses in tubular fashion the front and rear sights.

4. The thickness measuring device for insulating glass, as recited in claim 3, wherein the sight tube is of rectangular cross section.

5. The thickness measuring device for insulating glass, as recited in claim 2, wherein the front sight is formed as a vertical post and the rear sight is formed as a vertical notch.

6. The thickness measuring device for insulating glass, as recited in claim 1, wherein the movable member is slidingly attached so as to be movable parallel to the front edge of the base member.

7. The thickness measuring device for insulating glass, as recited in claim 2, wherein means to position said movable member include an elongated threaded shaft, rotatably attached to the base member in a fixed longitudinal position with respect to the base member; and a threaded receiving member fixed to said movable member, so that rotation of said threaded shaft will cause longitudinal movement of said threaded receiving member along the threaded shaft, and corresponding movement of the movable member.

8. The thickness measuring device for insulating glass, as recited in claim 1, wherein the plurality of markings on said base, each indicating a thickness of insulating glass, extend along the front edge of said base and include markings for 7/16-inch, ½-inch, ⅝-inch, ¾-inch, ⅞-inch and 1-inch thickness.

9. The thickness measuring device for insulating glass, as recited in claim 1, wherein the plurality of markings on said movable member, each indicate a thickness of single glass sheet and include markings for, or corresponding to, ¼-inch, 3/16-inch, ⅛-inch and 7/64-inch thickness.

10. The thickness measuring device for insulating glass, as recited in claim 1, wherein the reflective member comprises:
   a. a rigid reflective surface;
   b. a suction cup for temporary attachment to said second surface of insulation glass; and
   c. a spring member connected between said rigid reflective surface and said suction cup so as to bias said reflective surface firmly against said second surface of insulation glass.

11. The thickness measuring device for insulating glass, as recited in claim 1, wherein, additionally included is a glass thickness gauge for the measurement of the thickness of said single glass sheet, the thickness gauge comprising a rigid elongated light reflective member having a plurality of laterally spaced visible lines parallel to and individually spaced from a longitudinal edge of the gauge by distances corresponding to the thickness of single glass sheets which are used to form insulating glass.

12. A thickness measuring device for insulating glass having a plurality of single glass sheets which are parallel and separated by air space, the insulating glass having a near or first surface and a far or second surface, said thickness measuring device comprising:
   a. a base member, having a front edge for contacting said first surface of the insulating glass;
   b. sighting means mounted on said base and oriented angularly toward said first surface of the insulating glass; wherein the sighting means comprise a sighting member which includes a front sight formed as a vertical post and a rear sight formed as a vertical notch which front and rear sights are mutually alignable, and a sight tube of rectangular cross section which encloses in tubular fashion the front and rear sights;
   c. a movable member, slidingly attached to said base member so as to be movable parallel to the front edge of the base member, and having positioning means which include an elongated threaded shaft, rotatably attached to the base member in a fixed longitudinal position with respect to the base member, and a threaded receiving member fixed to said movable member, so that rotation of said threaded shaft will cause longitudinal movement of said threaded receiving member along the threaded shaft, and corresponding movement of the movable member;
   d. a target member, mounted on said movable member;
   e. a plurality of markings on said base, each indicating a thickness of insulating glass, which extend along the front edge of said base and include markings for 7/16-inch, ½-inch, ⅝-inch, ¾-inch, ⅞-inch and 1-inch thickness;
   f. a plurality of markings on said movable member, each indicating a thickness of said single glass sheets, and include markings for, or corresponding to, ¼-inch, 3/16-inch, ⅛-inch and 7/64-inch thickness;
   g. a separate reflective member for positioning on said second surface of the insulating glass, comprising:
      (1) a rigid reflective surface;
      (2) a suction cup for temporary attachment to said second surface of insulation glass; and
      (3) a spring member connected between said rigid reflective surface and said suction cup so as to bias said reflective surface firmly against said second surface of insulation glass.

13. The thickness measuring device for insulating glass, as recited in claim 12, wherein, additionally included is a glass thickness gauge for the measurement of the thickness of said single glass sheet, the thickness gauge comprising a rigid elongated light reflective member having a plurality of laterally spaced visible lines parallel to and individually spaced from a longitudinal edge by distances corresponding to the thickness of single glass sheets which are used to form insulating glass, said glass thickness gauge being affixed atop said sight tube of rectangular construction, and wherein, when an extending end of said threaded shaft and an upper edge of said rectangular sight tube are both placed in contact against the first surface of said insulating glass, the glass thickess gauge will be oriented with respect to said first surface so as to reflectively present for reading the thickness of the single glass sheet against which it is placed.

* * * * *